(12) United States Patent
Urban et al.

(10) Patent No.: US 8,480,330 B2
(45) Date of Patent: Jul. 9, 2013

(54) FIXTURE FOR ATTACHING A PROFILE RAIL TO ANOTHER COMPONENT

(75) Inventors: Hans Urban, Haag (DE); Ludwig Schletter, Haag (DE)

(73) Assignee: Schletter GmbH, Kirchdorf (DE)

( * ) Notice: Subject to any disclaimer, the term of this patent is extended or adjusted under 35 U.S.C. 154(b) by 531 days.

(21) Appl. No.: 12/139,137

(22) Filed: Jun. 13, 2008

(65) Prior Publication Data

US 2008/0310913 A1    Dec. 18, 2008

(30) Foreign Application Priority Data

Jun. 13, 2007 (DE) .................. 20 2007 008 471 U

(51) Int. Cl.
*F16B 7/04* (2006.01)

(52) U.S. Cl.
USPC ............. 403/400; 403/188; 403/387; 52/710

(58) Field of Classification Search
USPC ............... 403/187, 188, 253, 256, 257, 259, 403/381, 385, 387, 400, 403, 231, 254, 258, 403/49, 321, 398, 409.1; 52/173.3, 655.1, 52/710; 126/623; 136/244; 269/3, 6, 95, 249
See application file for complete search history.

(56) References Cited

U.S. PATENT DOCUMENTS

| | | | | |
|---|---|---|---|---|
| 1,019,343 A | * | 3/1912 | Moore et al. | 292/256.5 |
| 3,258,250 A | * | 6/1966 | McMullin | 403/188 |
| 4,432,590 A | * | 2/1984 | Lawrence et al. | 403/231 |
| 4,669,028 A | * | 5/1987 | Faa, Jr. | 361/717 |
| 5,346,328 A | * | 9/1994 | Vaders | 403/409.1 |
| 5,954,122 A | * | 9/1999 | Sittig | 403/409.1 |
| 6,397,551 B1 | * | 6/2002 | Lewcock et al. | 52/655.1 |
| 2004/0216399 A1 | | 11/2004 | Yamada et al. | 52/173.1 |
| 2004/0258474 A1 | * | 12/2004 | Oetlinger | 403/409.1 |

FOREIGN PATENT DOCUMENTS

| | | |
|---|---|---|
| BE | 1015540 | 6/2005 |
| DE | 25 57 708 | 6/1977 |
| DE | 75 02 125 | 7/1977 |
| DE | 3408250 | 9/1985 |
| DE | 297 17 793 | 1/1998 |
| DE | 197 47 887 | 5/1999 |
| DE | 198 30 784 | 1/2000 |
| DE | 10016608 | 10/2001 |
| DE | 102 13 725 | 10/2002 |
| DE | 10 2004 040 589 | 4/2006 |
| EP | 0 228 990 | 7/1987 |
| EP | 0 552 621 | 7/1993 |
| FR | 2 534 327 | 4/1984 |

OTHER PUBLICATIONS

Product Sheet for GridNorm the inexpensive standard cross-rail mounting system, Schletter Solar-Montagesysteme©, 2006.

* cited by examiner

*Primary Examiner* — Michael P Ferguson
(74) *Attorney, Agent, or Firm* — Norman B. Thot

(57) ABSTRACT

The present invention is directed to a fixture for attaching a profile rail having an undercut longitudinal groove to another component, the invention includes the arrangement of the fixture.

22 Claims, 6 Drawing Sheets

FIXTURE FOR ATTACHING A PROFILE RAIL TO ANOTHER COMPONENT

CROSS-REFERENCE TO RELATED PATENT APPLICATIONS

This patent application is based on and claims the benefit of German Application No. DE 20 2007 008 471 filed on Jun. 13, 2007, the content of which is incorporated herein in its entirety by reference thereto.

FIELD OF THE INVENTION

The invention relates to a fixture for attaching a profile rail having an undercut longitudinal groove to another component, as well as an arrangement of this fixture.

BACKGROUND OF THE INVENTION

Fixtures of this type are being installed in large numbers in substructures for solar module arrays on roofs and in open spaces. There the profile rails must be permanently attached in particular to components such as roof hooks, tin roof clamps, or other intersecting profile rails.

However, the known fixtures have disadvantages in terms of production cost, area of application, installation properties, or attachment quality.

The problem to be solved by the invention is therefore to create a fixture of the type referenced in the introduction that can generate a statically-sound attachment universally between the profile rail and components, and is at the same time particularly fast and simple to install, as well as inexpensive to fabricate.

SUMMARY OF THE INVENTION

The present invention is direct to a solution to these problems and provides a fixture. The fixture of the present invention is useful in effectively and efficiently attaching a profile rail having an undercut longitudinal groove to another component. The fixture comprises a main body, a gripping wedge, and a clamping screw.

The main body has a bearing surface for the profile rail and a hook segment projecting from the bearing surface, the hook segment being designed to engage the undercut of the longitudinal groove. The main body also has a slide ramp that rises relative to the bearing surface and parallel to the hook segment. In addition, the gripping wedge is disposed on the slide ramp and is slidable by means of a clamping screw. Here the clamping screw penetrates the gripping wedge in a first outlet and the slide ramp in a second outlet, the first and/or second outlet being oriented perpendicular to the hook segment. Finally, the main body has a rear surface opposite the bearing surface, on which rear surface the fixture can be tightened by the clamping screw against the other component.

Use of the fixture according to the invention enables in particular proven standard profile rails of essentially rectangular or square cross-section to be permanently attached to other components. Profile rails of this type can be fabricated in the extrusion process with complex inner contours, preferably out of aluminum. The undercut longitudinal groove is provided on one of the outer faces of the profile rail and can preferably run centrally. In particular for mounting solar modules, it is possible for the profile rail to have additional undercut longitudinal grooves on the other outer faces, preferably, one each on opposing outer faces. The longitudinal groove can also be bilaterally undercut, with the result that that the groove is able to receive screw nuts or other screw-on slot elements.

The other component by which the profile rail is to be permanently attached can, in particular, be a roof hook, a tin roof clamp, an attachment element for corrugated and trapezoidal roofs, and the like, as well as another profile rail. In the case of another profile rail, the two profile rails can intersect, preferably at a right angle. When used in substructures for solar modules, what is shared by these other components is that they are employed as supporting members for the profile rail and their mounting surfaces are generally inclined, e.g., by 30°, and are generally flat. To implement a screw connection with the fixture, a through-hole or an internal thread, preferably, however, an elongated hole, a slot, or an undercut groove can be provided in the other component, with the result that that the clamping screw is able to be screwed on to the component by a screw nut or a screwable slot element.

The main body of the fixture is provided spatially between the profile rail and the other component, i.e., it is not necessary for the profile rail and the other component for attachment to touch each other by means of the fixture. The main body along the hook segment can be of any width, although a width of between 2 and 5 cm has proven to be especially appropriate.

The bearing surface and hook segment are provided for mounting and inserting the profile rail, wherein the assembly or insertion operation is preferably characterized by two mutually perpendicular motion components: an essentially vertical mounting of the profile rail on the support surface and a subsequent transversal movement toward the hook segment. The bearing surface is thus preferably of a flat design. It is of course obvious that the cross-sectional contour of the hook segment is appropriately matched to that of the undercut longitudinal groove. In particular, the height and width of the overhang of the undercut and the extent of the opening slot that is delimited by the overhang must be taken into account. The hook segment is designed analogously to a strip and can divide the support surface into two halves, preferably of approximately equal size, such that the profile rail can be braced at its outer face on both sides of the undercut longitudinal groove in cross-section completely on the bearing surface.

The slide ramp can be designed as a conventional wedge, or also in different form with a preferably flat siding surface rising to the bearing surface, wherein the bearing surface preferably transitions at a break into the slide ramp. The function of the slide ramp is provided over a broad chamfer region, a chamfer of approximately 1 to 0.7 having proven to be practical.

The clamping screw can be a conventional headed screw that sits by its head on the gripping wedge and is provided to be screwed into an inside thread. It is, however, also conceivable that the clamping screw be associated with another component such that the main body and the gripping wedge are mounted on these for installation, and the clamping screw can be practically screwed in together with a nut supported on the gripping wedge. In addition, the clamping screw can penetrate the gripping wedge and the slide ramp preferably perpendicular to the bearing surface, thereby increasing the compatibility of the fixture with other components. It should, however, also be possible to guide the clamping screw obliquely to the bearing surface, e.g., perpendicular to the rear surface if this is not parallel to the bearing surface. For special applications, in particular, for reasons of statics, additional angles are conceivable. In these cases, the top side of the gripping wedge can be adapted to the obliquely guided clamping screw.

The first and second opening in the gripping wedge or in the slide ramp are through-type openings, in particular, through-holes. What is primarily suitable as a longitudinal opening is a through-type elongated hole. However, unilateral open slits are, for example, also conceivable.

The gripping wedge is primarily essentially a triangular cross-section, with the result that preferably what is provided is a top side parallel to the bearing surface to which the clamping screw can be attached, a side vertical to the bearing surface that is intended for pressing on to the profile rail, as well as an oblique sliding face by which the gripping wedge sits on the slide ramp.

The rear surface of fixture preferably has a flat section or can be completely flat. Given a similarly flat bearing surface, what thus results is a plate-like main body between the bearing surface and the rear surface, the body projecting from the hook segment.

Installation of the fixture is preferably effected in three steps: In the first step, the fixture is loosely preattached by the clamping screw to the other component, where the gripping wedge can remain on the upper section of the slide ramp. For example, the fixture can be mounted on the bracket of a roof hook and loosely held by the clamping screw in the elongated hole of the bracket, where the clamping screw can be secured by a nut to the rear side of the bracket. In a second step, the profile rail can be mounted on the main body and then slid against the hook segment. Finally, in the last step, the clamping screw is screwed in, wherein the fixture, or its main body, is advantageously tightened on the rear surface or against the other component, and at the same time the profile rail is securely clamped in place within the main body. If a longitudinal opening is provided here in the slide ramp and only one through-hole is provided in the gripping wedge, the clamping screw moves as a unit with the gripping wedge, with the result that it can be advantageous to also provide a longitudinal opening in the other component that can accommodate the movement of the clamping screw.

For purposes of a multiple installation in an array, multiple fixtures can be preattached in the above-described manner such that the profile rail is assemblable simultaneously with multiple fixtures, where if necessary individual fixtures can be slid perpendicular to the array or to the profile rail for purposes of balancing. After the profile rail is assembled with all fixtures and the profile rail is correctly aligned, all of, or if necessary the remaining clamping screws, can be screwed in place.

However, other installation sequences are also conceivable. It is possible, for example, to first connect the fixture to the profile rail, and then to mount the fixture including the profile rail onto the other component, or also to mount the other component on the fixture. Similarly, the invention is not limited to specific spatial orientations of the fixture.

In comparison with the known solutions, the fixture according to the invention excels in terms of its simple and fast installation, as well as in its wide scope of application. What is essential here is that using one and the same clamping screw both the profile rail can be clamped in place in the fixture and the fixture itself can be tightened to the other component. The clamping screw here can be selected so as to first the rest of the system, with the result that no additional tools are required—an aspect that is of particularly great advantage for use on roofs. Also advantageous is the fact that the clamping screw is actuatable from the above, and the profile rail can already be preattached by simple insertion or hooking-in.

The broad scope of application results from the fact that the other component only needs a simply retained installation surface and screw-attachment capability. In addition, the main body can be adapted to a multiplicity of different profile rails.

The fixture can be installed immediately on the end, or also preinstalled in two steps—an aspect that is of great value when installing an array. The fixture can thus be first attached to the other component, for example, by a roof hook, without tightening down the other component, with the result that that gripping wedge remains in the upper section of the slide ramp. The profile rail can then be inserted in the fixture, whereby the position of the fixture is easily modifiable, in particular, slidable, for purposes of balancing and adjustment on the other component. In addition, it is possible to rotate the fixture relative to the other component such that almost any desired intersecting angles are possible, or, for example, the imprecise installation of a roof hook can be easily corrected.

The fixture also provides advantages from the aspect of statics. The rail is thus kept quite close to the center of mass of the cross-section by the hook segment. Furthermore, the screw connection passes very close to the profile cross-section in a statically advantageous manner. In addition, the attachment in terms of statics is simple to analyze or document.

In an especially preferred embodiment, the hook segment has a gripping gradient. The gripping gradient is preferably disposed on the bottom side of the retaining projection of the hook segment. When the profile rail is hooked in or the overhang of the undercut longitudinal groove is inserted under the retaining projection, this aspect enables the profile rail to be grippingly retained within the main body. The cross-sectional contour of the hook segment here is preferably selected such that the face of the overhang cannot be applied to the hook segment, thereby always creating a secure clamping connection. This supplemental clamping of the profile rail by the hook segment enormously simplifies the installation on inclined surfaces, for example, on sloping roofs. The profile rail can thus already be relatively tightly clamped in the fixture with the fixture still open, i.e., the gripping wedge is still located at the top section of the slide ramp, while the fixture itself is still slidable or rotatable on the other component. The advantage of the preliminary retention of the profile rail by the gripping wedge is particularly great in the event the main body is disposed with such an incline that the retaining projection of the hook segment is aimed downwards such that the profile rail could not be held on the hook segment without the gripping gradient.

In a preferred embodiment, the main body is extruded along the hook segment. The main body can thus be fabricated inexpensively by the simple trimming to size of an extruded part. The through-type opening in the slide ramp must of course be incorporated subsequently, e.g., by drilling, cutting, or preferably by blanking. In addition, the gripping segment can also be fabricated in this way.

In an especially preferred embodiment, a loss-prevention means is provided that holds the gripping wedge on the slide ramp. It is extremely advantageous here if the loss-prevention means functions elastically so that the gripping wedge is secured against loss over the entire sliding range on the slide ramp. The elastic loss-prevention means here can be, in particular, a rubber band, a rubber ring, or the like.

In connection with hooking in the profile rail, what has proven especially helpful during assembly is to have the loss-prevention means elastically hold the gripping wedge in the top section of the slide ramp. This allows the profile rail to be hooked into the fixture that is already preinstalled on the other component without the need to slide or subsequently mount the gripping wedge. An elastically implemented loss-prevention means can be practically inserted both in a groove on the rear side of the slide ramp and also in a groove on the side of the gripping wedge facing the profile rail.

In a preferred embodiment, a stop for the gripping wedge is provided here a the top end of the slide ramp so that the elastic loss-prevention means is not able to pull the gripping wedge beyond the top end of the slide ramp when the clamping screw has not yet been inserted. In a preferred embodiment, a groove partially accepting the gripping wedge can be provided in the stop. This enables the gripping wedge to be blocked even more securely at the top end of the slide ramp.

In another preferred embodiment, the main body is recessed in the region between the rear side of the slide ramp and the other component, the top portion of the slide ramp being provided with a brace relative to the other component. This enables the slide ramp to be implemented in particular as flat so that, unlike the wedge-shaped design, the rear side of the slide ramp does not come to rest on the other component, and additionally less material is required for the main body. The additional bracing here ensures that the forces from tightening the clamping screw are advantageously diverted to the other component, and the main body, in particular, does not tilt.

In another preferred embodiment, the main body has a ridge in the region on the back of the slide ramp, the ridge projecting slightly beyond the rear surface of the main body. This means that if the fixture is placed on the flat surface of the other component, the main body contacts the other component initially only on the ridge and at end of the rear surface opposite thereto. As a result, the rear surface is inclined slightly forward relative to the flat surface of the other component, with the result that when the clamping screw is tightened the main part of the rear surface is pressed against the other component, and at the same time, a pressing pretensioning force is created in the main body, preferably, in the area of the hook segment, due to the elasticity of the main body deformed in response to the tightening, this pretensioning force being advantageous.

In another preferred combination of the two above-described embodiments, the ridge is a base provided at the brace of the slide ramp.

In a preferred arrangement of the fixture, the other component is inclined and the fixture is disposed on the other component such that the retaining projection of the hook segment aims downward and the profile rail is inserted into the fixture. This enables the center of mass for the cross-section of the profile rail to be disposed above the screw connection, which aspect is very advantageous for reasons of statics. In this case, provision of a gripping gradient on the hook segment is especially advantageous since the profile rail is held by clamping thereby on the hook segment against the downward sloping force.

In the above-described arrangement, the other component can, in particular, be a roof hook, a tin roof clamp, an attachment element for corrugated or trapezoidal roofs, or another profile rail. If the other component is another profile rail, this can intersect the profile rail that sits in the fixture, preferably, at right angles. Other angles of intersection are, however, also conceivable.

BRIEF DESCRIPTION OF THE DRAWINGS

Embodiments of the invention, as well as three preferred arrangements, are described in detail below based on the drawings. In the drawings.

DETAILED DESCRIPTION OF THE INVENTION

Figure 1:
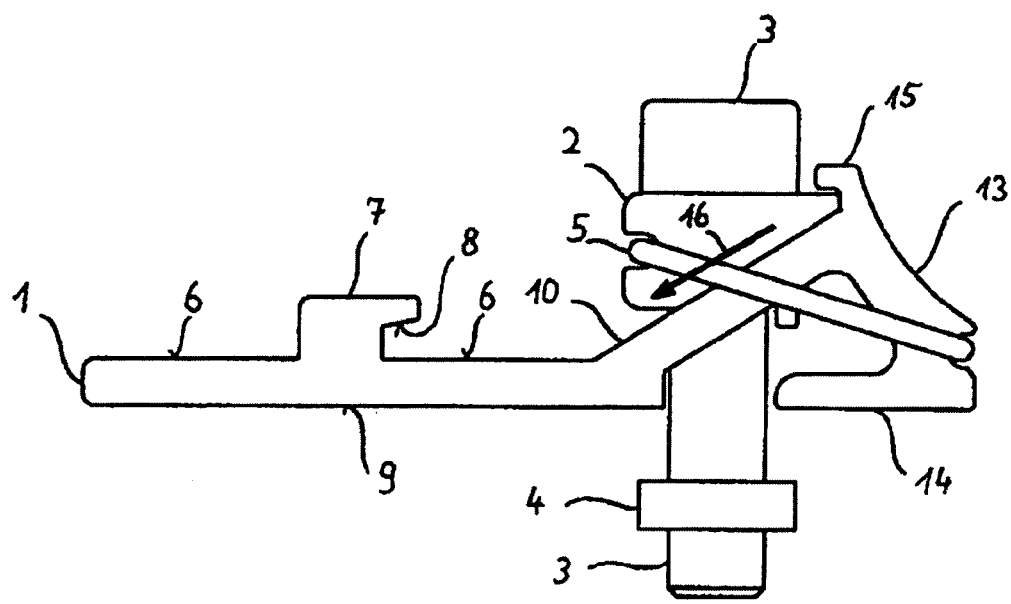
FIG. 1 is a side view of the fixture according to the invention.

The fixture shown in FIG. 1 is composed of the following components: a main body 1, a gripping wedge 2, a clamping screw 3, a square nut 4, and a rubber ring 5.

As is evident in FIG. 4 through FIG. 8, the fixture is used to attach a profile rail 20 that has an undercut longitudinal groove 21 to another component. The other component can, in particular, be another intersection profile rail 30, a roof hook, a tin roof, or trapezoidal roof fastener. Profile rail 20 is suited in particular for mounting solar modules.

Main body 1 of the fixture in FIG. 1 is extruded perpendicular to the plane of the drawing and has a bearing surface 6 and a hook segment 7 projecting from bearing surface 6. Bearing surface 6 and hook segment 7 are provided for the clamping retention of profile rail 20, wherein hook segment 7 is designed to engage the undercut of longitudinal groove 21 of profile rail 20. At the bottom side of its retaining projection, facing right in the drawing, hook segment 7 is open by about 100 relative to bearing surface 6. As is evident in more detail in FIG. 2 and FIG. 3, this opening of the retaining projection functions as a gripping gradient 8 for the overhang, at right in the drawing, of undercut longitudinal groove 21. Profile rail 20 is thus preattached within main body 1 after insertion, both by positive fit and also due to the slight pretensioning by frictional fit. Gripping gradient 8 also enables the overhang of undercut longitudinal groove 20 to be easily introduced under the retaining projection of hook segment 7.

Also evident is that hook segment 7 divides bearing surface 6 into two approximately equal-sized partial surfaces that are provided on both sides of undercut longitudinal groove 21 for the outer surfaces of profile rail 20. Bearing surface 6, or its two partial surfaces, are of sufficient size to completely accommodate profile rail 20 transversely, and also to enable the insertion and extraction of profile rail 20 in or from hook segment 7.

Main body 1 furthermore has opposite bearing surface 6 a rear surface 9 on which the fixture can be assembled with the other component. Bearing surface 6 and rear surface 9 are both of flat design and mutually parallel, with the result that main body 1 in this area has a plate-like shape.

Figure 2:
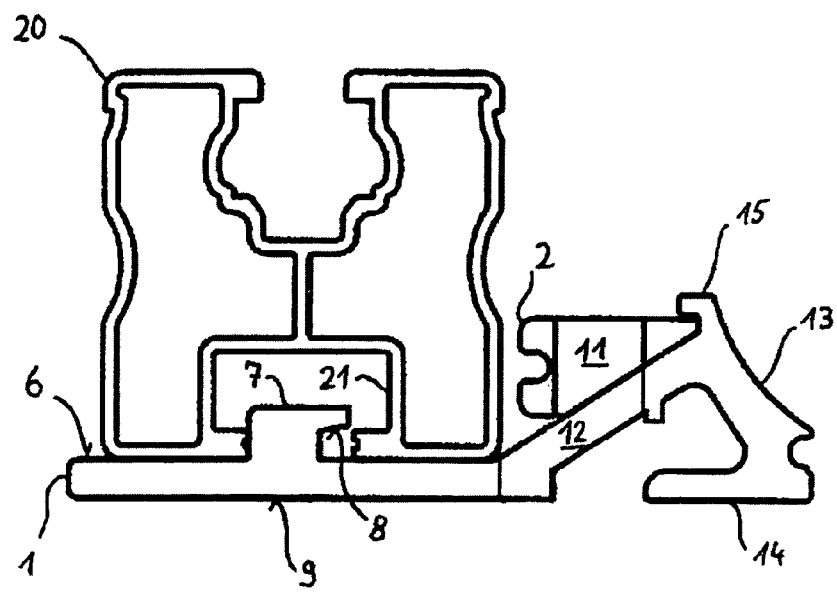
FIG. 2 shows a cross-section of the fixture according of FIG. 1 together with a mounted profile rail.
Figure 3:
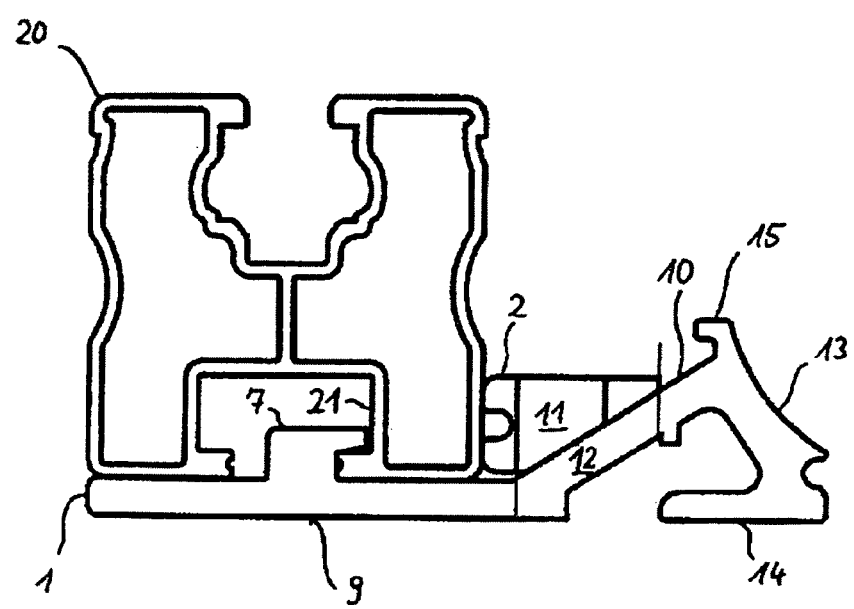
FIG. 3 shows a cross-section as in FIG. 2, however, with the profile rail clamped in place.

Main body 1 furthermore has a slide ramp 10 that rises relative to bearing surface 6 and parallel to hook segment 7. Bearing surface 6 here transitions at a break directly into slide ramp 10. The essential aspect is that hook segment 7 with its retaining projection faces the slide ramp. In addition, slide ramp 10, as is evident in more detail in FIG. 2 and FIG. 3, is penetrated along its slope or perpendicular to hook segment 7 by an elongated hole 12. Also evident is that slide ramp 10 also is of a plate-like design such that the triangular region below slide ramp 10 is free of material, thereby enabling elongated hole 12 to simply work by blanking. The top end of slide ramp 10 is furthermore provided with a brace 13 to the other component. Brace 13 here has a planar base 14 for mounting the other component. Also evident is that clamping screw 3 passes to the other component between base 14 and rear surface 9.

Gripping wedge 2 is of essentially triangular cross-section and accordingly has a top side parallel to bearing surface 6, a gripping side parallel to the outside of profile rail 21, and an inclined sliding surface. Gripping wedge 2 is, as evident more clearly in FIG. 2 and FIG. 3, provided for clamping profile rail 20 against hook segment 7. To this end, gripping wedge is slidably disposed on slide ramp 10 by clamping screw 3 along arrow 16, where clamping screw 3 is supported at its head on the top side of gripping wedge 2 and penetrates gripping wedge 2 perpendicular to bearing surface 6, and is guided within elongated hole 13 of slide ramp 10. To this end, gripping wedge 2, as evident more clearly in FIG. 2 and FIG. 3, has a through-hole 11 that aligns with elongated hole 12.

As is evident in particular in FIG. 1, gripping wedge 2 including clamping screw 3 and square nut 4 are retained in an upper section by rubber ring 5 on slide ramp 10. There gripping wedge 2 is found in the opened or non-gripping position. Rubber ring 5 is inserted in two grooves to hold gripping wedge, of which grooves one is cut out on the gripping side of gripping wedge 2 and one is cut out on the side of base 14 facing away from slide ramp 10. As a result, rubber ring 5 crosses slide ramp 10 on both sides, where rubber ring 5 is additionally tensioned along arrow 16 in response to a downward motion of gripping wedge 2. Finally, a stop 15 for gripping wedge 2 is disposed at the top end of slide ramp 10. In stop 15, a groove partially accommodating the gripping wedge is provided that ensures that gripping wedge 2 remains in place on slide ramp 10 despite the pulling force of rubber ring 5 in so far as clamping screw 3 has not yet been tightened.

FIG. 2 and FIG. 3 show in particular how profile rail 20 is inserted in the fixture of FIG. 1, and can be clamped in place by gripping wedge 2 that is slidable on slide ramp 10. In addition, through-hole 11 in gripping wedge 2, and elongated hole 12 in slide ramp 10, are shown in these cross-sections. The diagram omits clamping screw 3 with square nut 4, as well as rubber ring 5.

Profile rail 20 has a rectangular cross-section and is provided both on the top and the bottom with an undercut longitudinal groove. Profile rail 20 with its flat bottom, from which undercut longitudinal groove 21 is cut out, is placed on bearing surface 6 and hook segment 7 such that hook segment 7 projects in parallel into undercut longitudinal groove 21, and the bottom of the profile rail rests on both sides of longitudinal groove 21 on the partial surfaces of bearing surface 6. The cross-sectional contour of hook segment 7 is appropriately matched to that of undercut longitudinal groove 21, where gripping gradient 8 is designed such that the face of the overhang cannot strike hook segment 7, with the result that upon insertion a frictional connection is always created between main body 1 and profile rail 20.

FIG. 2 shows the fixture in the not-yet-opened position and with mounted, but not yet inserted, profile rail 20. Accordingly, gripping wedge 2 is disposed on the top end of slide ramp 10, and hook segment 7 does not yet engage undercut longitudinal groove 21.

FIG. 3 now shows the fixture in the closed position. Profile rail 20 has been slid on bearing surface 6, either by hand or possibly already by gripping wedge 2, perpendicular to the hook segment, or inserted under this segment, where gripping gradient 8 pre-locates the overhang of undercut longitudinal groove 21 by positive fit as well as by a slight pretensioning. Permanent tightening of profile rail 20 against the hook segment is then effected by tightening down clamping screw 3, where gripping wedge 2 is pressed by its gripping side against the right, in the drawing, outer side of profile rail 20.

Figure 4:
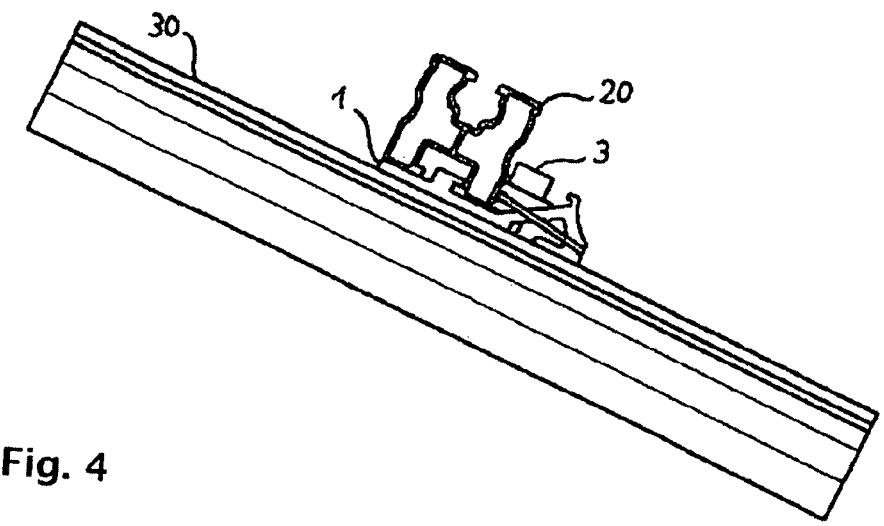
FIG. 4 is a side view of a first arrangement of the fixture of FIG. 1 together with two intersecting profile rails.
Figure 5:
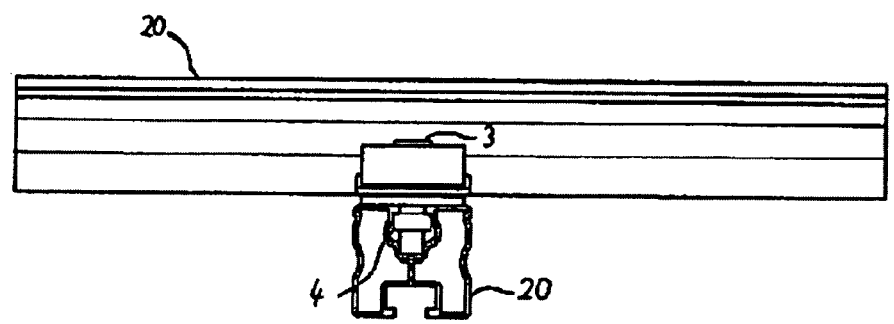
FIG. 5 is a front view of a first arrangement as in indicated FIG. 4.
Figure 6:
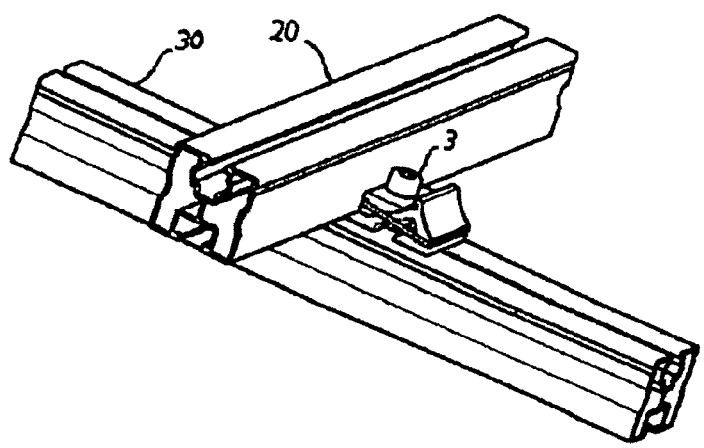
FIG. 6 is a perspective view of a first arrangement as in indicated in FIG. 4.

FIG. 4 through FIG. 6 show a first preferred arrangement of the fixture of FIG. 1. The fixture attaches profile rail 20 of FIG. 2 and FIG. 3 permanently to a crossing profile rail 30. Profile rail 30 can in particular be an inclined component of a roof-based or open-space mounting system for solar modules, and is therefore by way of example illustrated with an inclination of approximately 25°. In addition, profile rail 30 has the same cross-section as profile rail 20, i.e., profile rail 30 also has undercut longitudinal grooves on its top and bottom sides, the grooves being provided for screw connections to other parts. Also evident is that profile rail 20 is disposed in rectangular crossing fashion over profile rail 30.

The fixture is placed on the rear surface 9 of main body 1 on the top side of profile rail 30, where for reasons of statics it is essential that hook segment 7 with its retaining projection face downward or slide ramp 10 face upward, so that the center of mass of the cross-section of profile rail 20 is disposed above the screw connection. Clamping screw 3 projects into the top undercut longitudinal groove of profile rail 30. Here the fixture can be slid on previously together with square nut 4 onto profile rail 30. However, it is also possible to preposition square nut 4 beforehand in the top longitudinal groove of profile rail 30 approximately at the intended installation position, and to then screw on the rest of the fixture together with this nut. In any case, clamping screw 3 is locked by square nut 4 in the top undercut longitudinal groove of profile 30, where two of the nuts sides contact the groove walls such that any twisting relative to profile rail 30 is impeded, as is shown in particular in FIG. 5. In addition, the tensioning force of rubber ring 5 causes gripping wedge 5 including clamping screw 3 and square nut 4 to be pulled upward on the slide ramp, with the result that that square nut 4 grips the overhang of the undercut groove, and as a result the fixture is able to be slidably preattached on profile rail 30. It may also be useful here to slightly tighten the screw connection.

As in FIG. 2 and FIG. 3, profile rail 20 is combined with the fixture, wherein gripping gradient 8 plays an essential role since after insertion of the profile rail into the still opened fixture the profile rail is grippingly retained on the hook segment against the downward sloping force. In principle, it is also possible to first mount the fixture on profile rail 20, slide it on, and then mount both on profile rail 30. For final assembly, clamping screw 3 is tightened so as to frictionally tension the fixture at rear surface 9 against the top side of profile rail 30, thereby clamping in place profile rail 20 in the fixture against hook segment 7 by frictional/positive fit.

For purposes of installation in an array, multiple such fixtures can be preinstalled in the described manner on profile rail 30, wherein profile rail 20 is mounted simultaneously in multiple fixtures and grippingly preattached to the hook segments by insertion, wherein as necessary individual fixtures for balancing purposes can be appropriately slid on along each profile rail 30. After profile rail 20 has be correctly aligned, all or the rest of the screw connections can be tightened down so that at the same time the respective permanent attachment is generated between the fixture and profile rail 30, and between the fixture and profile rail 20.

Figure 7:
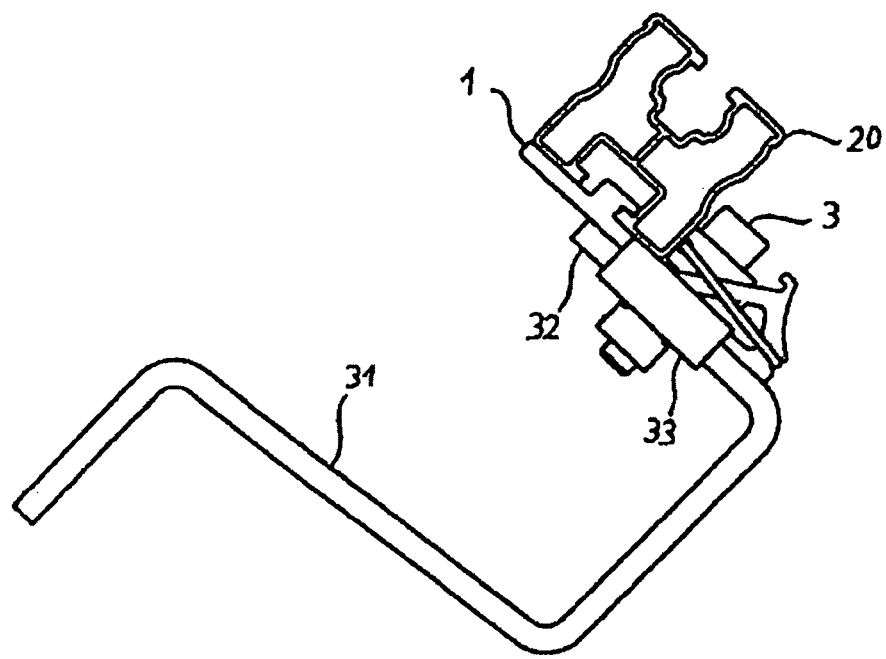
FIG. 7 is a side view of a second arrangement of the fixture of FIG. 1 together with a profile rail and a roof hook.
Figure 8:
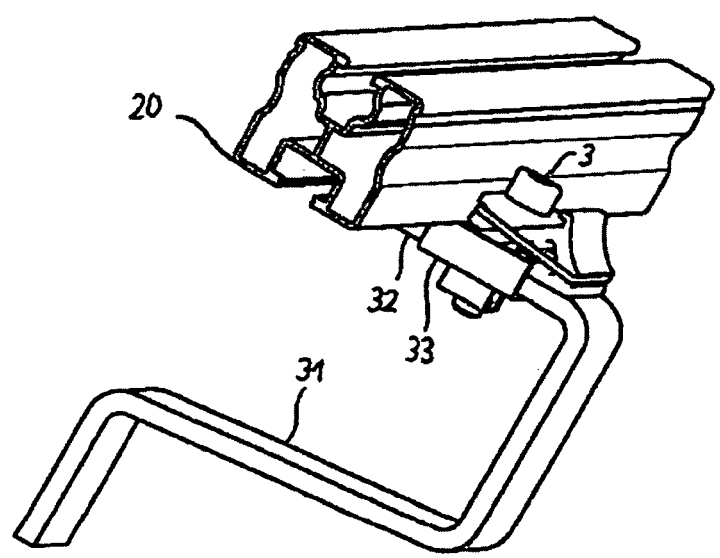
FIG. 8 is a perspective view of the second arrangement as indicated in FIG. 7.

In addition, FIGS. 7 and 8 show a second preferred embodiment of the fixture of FIG. 1. The fixture permanently attaches profile rail 20 of FIG. 2 to a common roof hook, of which the drawing shows only its multiply bent segment 31. Once the roof hook is appropriately installed on the roof, the top segment section 32 of segment 31 generally runs parallel to the rafters of the roof. Top segment section 32 is thus disposed at an inclination of approximately 45° in the drawing. In addition, an elongated hole for a screw connection to the mounting parts is provided as usual in top segment section 31, not shown.

The fixture is placed on a partial region of rear surface 9 of main body 1 on the top side of top segment section 32, wherein for reasons of statics it is against essential that hook segment 7 with its retaining projection face downward, or slide ramp 10 face upward such that the center of mass of the cross-section of profile rail 20 is disposed above the screw connection. Clamping screw 3 penetrates the elongated hole of the top segment section 32, wherein clamping screw 3 is locked to the rear side of top segment section 32 by square nut 4 of FIG. 1, where this nut is integrated in a slidable ancillary part 33 that functions as an antitwist device relative to top segment section 32, with the result that no tool is required to secure square nut 4.

As in FIG. 4 through FIG. 6, profile rail 20 is combined with the fixture, wherein profile rail 20 is disposed in rectangular crossing fashion over top segment section 32, or perpendicular to the rafters of the roof. For final assembly, again the fixture is tensioned frictionally on rear surface 9 against the top side of top segment section 32 by tightening clamping screw 3, and profile rail 20 is simultaneously clamped in place in the fixture by frictional/positive fit. An array assembly is similar to that of crossing profile rail 30 of FIG. 4 through FIG. 6, wherein the elongated hole in top segment section 32 can be used for balancing and adjustment, instead of the longitudinal groove.

Figure 9:
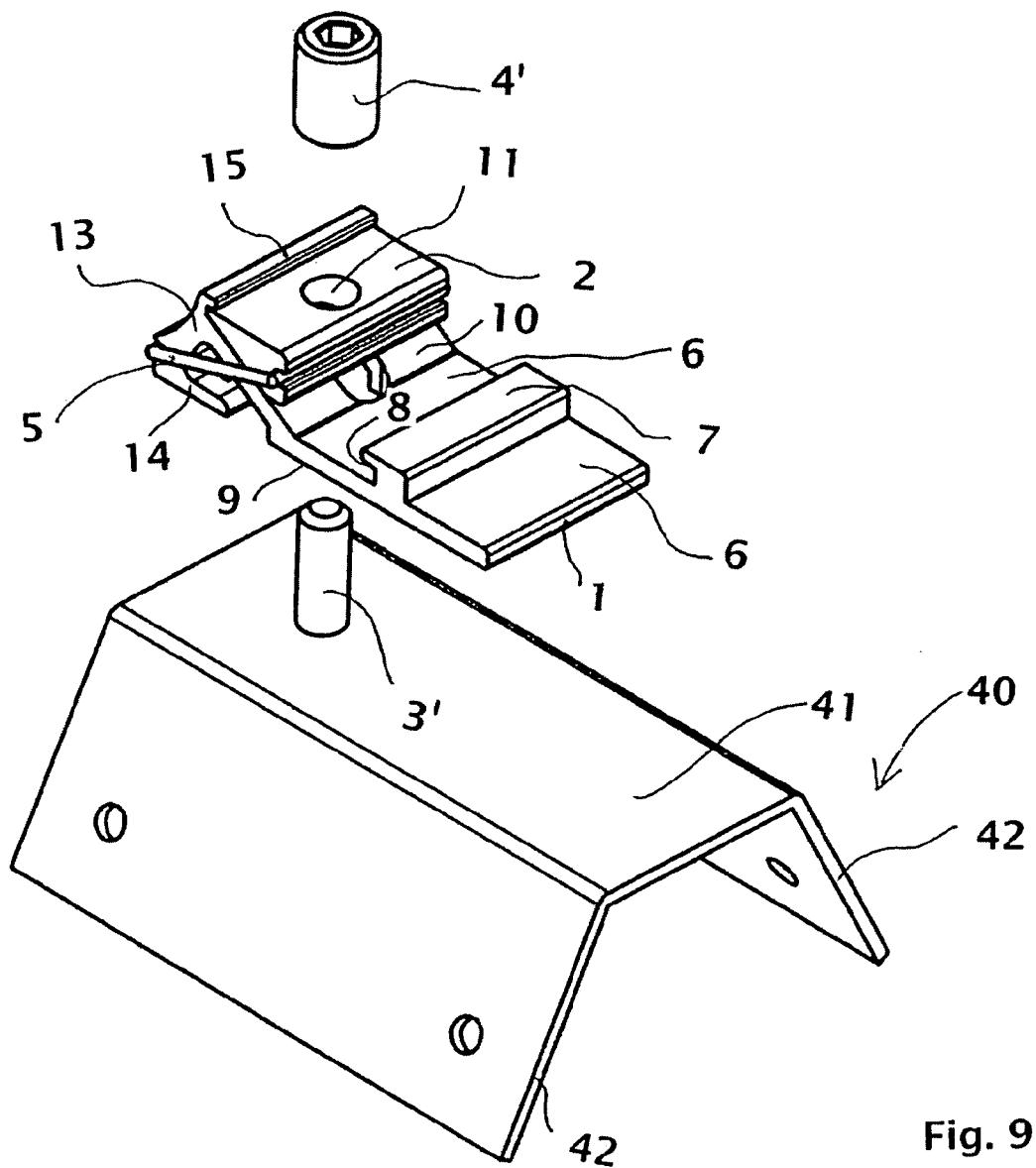
FIG. 9 is a perspective exploded view of a third arrangement of a slightly modified fixture as indicated in FIG. 1.

FIG. 9 shows a third preferred arrangement of a slightly modified form of the fixture of FIG. 1. The fixture can permanently attach a profile rail 20, as indicated in FIG. 2 but not shown here, to a retainer 40 for trapezoidal metal sheets, a so-called trapezoidal sheeting clip. To this end, retainer 40 can be mounted on a trapezoidal rib, not shown here, of a trapezoidal metal sheet, and screwed on to this rib. The side flanges 42 of retainer 40 here encompass the side flanges of the trapezoidal rib. The fixture differs from that of FIG. 1 only in so far as the clamping screw 3' is passed not from above but from below through through-hole 11 and elongated hole 12, since clamping screw 3' is permanently disposed on the top side 41 of retainer 40 in the form of a projecting threaded rod. What is also shown is that a separate screw head 4' is provided that is designed as a sleeve nut having a sufficient thread pitch.

Figure 10:
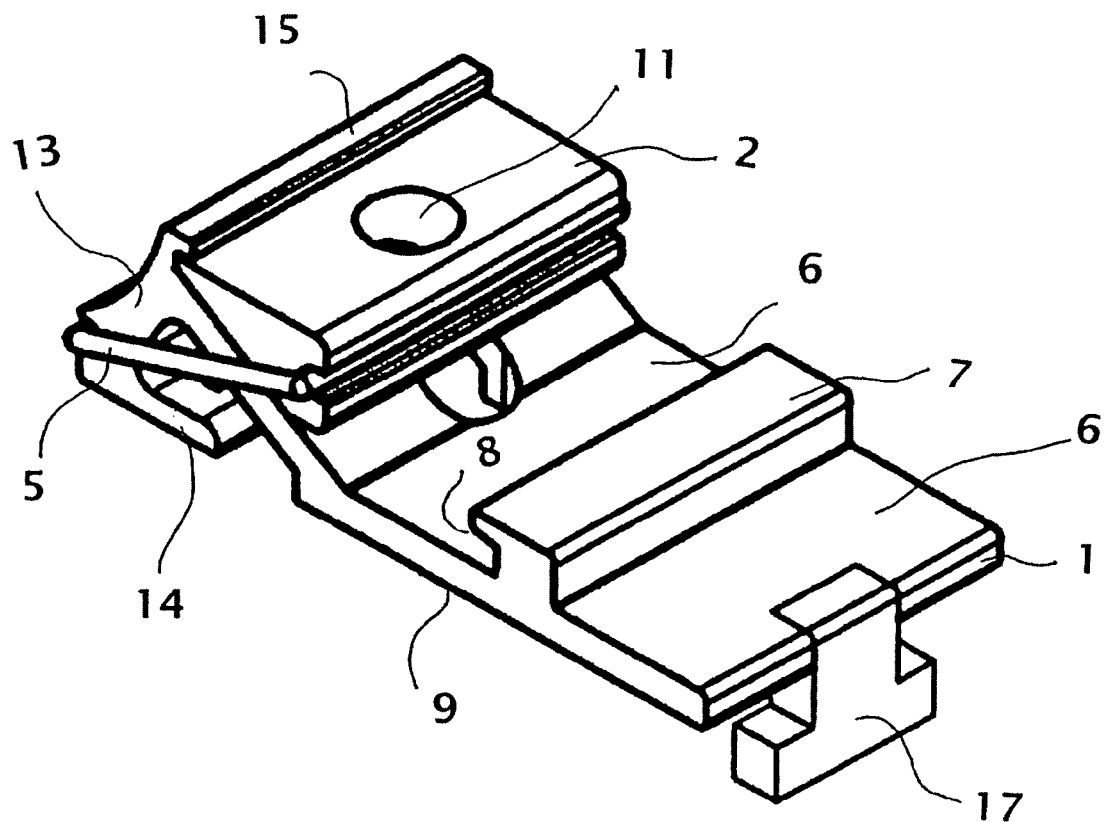
FIG. 10 is a perspective view of a slightly modified fixture as indicated in FIG. 1.

Finally, FIG. 10 shows a slightly modified embodiment of the fixture of FIG. 1, wherein illustration of clamping screw 3 has been omitted. In contrast to the fixture of FIG. 1, what is additionally provided is a T-shaped slotted anchor 17 that is incorporated in main body 1 and projects downward from rear surface 9. Slotted anchor 17 functions as an additional anchorage in case the other component, as in FIG. 5, is a profile rail 30 with an undercut longitudinal groove facing toward rear surface 9. Slotted anchor 17 here is disposed parallel to hook segment 7 and, as is the case with square nut 4 of FIG. 5, passes within the undercut longitudinal groove. For purposes of mounting the fixture, main body 1 can either be pushed together with slotted anchor 17 into the longitudinal groove, or, on the other hand, rotated or inserted from above.

What is claimed is:

1. A fixture for attaching a profile rail comprising an undercut longitudinal groove to a component disposed to support the profile rail, the fixture comprising:
    a main body comprising:
        a flat planar bearing surface for the profile rail,
        a rear surface disposed opposite to the flat planar bearing surface,
        a linear hook segment projecting from the flat planar bearing surface so as to divide the flat planar bearing surface into two coplanar partial surfaces so that the profile rail can rest on each of the two coplanar partial surfaces, the linear hook segment being configured to engage the undercut longitudinal groove, and
        a slide ramp comprising a second opening, the slide ramp protruding outwardly away from and rising relative to the flat planar bearing surface and being parallel to the linear hook segment;
    a clamping screw means configured to tighten the fixture against the component at the rear surface; and
    a gripping wedge of essentially triangular cross-section comprising a top side parallel to the flat planar bearing surface, a gripping side vertical to the flat planar bearing surface, and a first opening, the gripping wedge being disposed on the slide ramp and being configured so as to be slidable via the clamping screw means such that the gripping side contacts the profile rail so as to slide the profile rail along the two coplanar partial surfaces of the flat planar bearing surface and clamp the profile rail against the linear hook segment;
    wherein,
    the clamping screw means is configured to penetrate the first opening of the gripping wedge and the second opening of slide ramp,
    at least one of the first opening and the second opening is a longitudinal opening oriented perpendicular to the linear hook segment, and
    the main body is disposed to be arranged between the profile rail and the component.

2. The fixture as recited in claim 1, wherein the linear hook segment further comprises a gripping gradient configured to clamp the profile rail.

3. The fixture as recited in claim 1, wherein the main body is extruded.

4. The fixture as recited in claim 1, further comprising a loss-prevention means configured to retain the gripping wedge on the slide ramp.

5. The fixture as recited in to claim 4, wherein the loss-prevention means elastically retains the gripping wedge on the slide ramp.

6. The fixture as recited in claim 5, wherein the loss-prevention means elastically retains the gripping wedge in a top section of the slide ramp.

7. The fixture as recited in claim 6, wherein the slide ramp includes a first groove on a rear-side area, the gripping wedge includes a second groove on the gripping side facing the profile rail, and the loss-prevention means is a rubber ring configured to be inserted into both the first groove and the second groove.

8. The fixture as recited in claim 7, wherein the gripping wedge further includes a stop on a top end of the slide ramp.

9. The fixture as recited in claim 8, wherein the stop includes a groove configured to partially accommodate the gripping wedge.

10. An arrangement of a component and the fixture as recited in claim 1, wherein the main body is recessed between a rear side of the slide ramp and the component, and a top section of the slide ramp is provided with a brace to the component.

11. The arrangement as recited in claim 10, wherein the main body further comprises a ridge in a rear area of the slide ramp, the ridge being configured to project above the rear surface of the main body.

12. The arrangement as recited in claim 11, wherein the ridge is a base provided on the brace.

13. An arrangement of a component, a profile rail, and the fixture as recited in claim 1, wherein the component is inclined for mounting a solar panel, the fixture is disposed on the component such that a retaining projection of the linear hook segment aims downward, and the profile rail is combined with the fixture.

14. The arrangement as recited in claim 13, wherein the component is at least one of a roof hook, a tin roof clamp, a fastening element for corrugated or trapezoidal roofs, and another profile rail.

15. The arrangement as recited in claim 14, wherein the component is the another profile rail, and the another profile rail crosses the profile rail.

16. The fixture as recited in claim 1, wherein the main body further comprises a T-shaped slotted anchor projecting from the rear surface.

17. An arrangement of a component and the fixture as recited in claim 1, wherein the clamping screw means is permanently disposed onto the component in the form of a projecting threaded rod.

18. The fixture as recited in claim 1, wherein the gripping wedge is configured to grip the profile rail.

19. A fixture for attaching a profile rail comprising an undercut longitudinal groove to a component disposed to support the profile rail, the fixture comprising:
a main body comprising:
a flat planar bearing surface for the profile rail,
a rear surface disposed opposite to the flat planar bearing surface,
a hook segment projecting from the flat planar bearing surface so as to divide the flat planar bearing surface into two coplanar partial surfaces so that the profile rail can rest on each of the two coplanar partial surfaces, the hook segment being configured to engage the undercut longitudinal groove, and
a slide ramp comprising a second opening, the slide ramp protruding outwardly away from and rising relative to the flat planar bearing surface and being parallel to the hook segment;
a clamping screw means configured to clamp the profile rail to the fixture and to tighten the fixture to the component at the rear surface; and
a gripping wedge of essentially triangular cross section comprising a top side parallel to the flat planar bearing surface, a gripping side vertical to the flat planar bearing surface, and a first opening, the gripping wedge being disposed on the slide ramp and being configured so as to be slidable via the clamping screw means such that the gripping side contacts the profile rail so as to slide the profile rail along the two coplanar partial surfaces of the flat planar bearing surface and clamp the profile rail against the hook segment;
wherein,
the clamping screw means is configured to penetrate the first opening of the gripping wedge and the second opening of slide ramp,
at least one of the first opening and the second opening is a longitudinal opening oriented perpendicular to the hook segment, and
the main body is arranged to be between the profile rail and the component.

20. A fixture for attaching a profile rail (20) having an undercut longitudinal groove (21) to another component (30, 31, 40) disposed to support the profile rail (20), the fixture comprising a main body (1), a gripping wedge (2), and a clamping screw (3, 3'), wherein:
the main body (1) has a flat planar bearing surface (6) for the profile rail (20) and a linear hook segment (7) projecting from the flat planar bearing surface (6), the linear hook segment being designed to engage the undercut (21) of the longitudinal groove (20);
the main body (1) has a slide ramp (10) that protrudes outwardly away from and rises relative to the flat planar bearing surface (6) and parallel to the linear hook segment (7);
the gripping wedge (2) has an essentially triangular cross section comprising a top side parallel to the flat planar bearing surface (6), a gripping side vertical to the flat planar bearing surface (6), and a first opening, the gripping wedge (2) being disposed on the slide ramp (10) and being configured so as to be slidable via the clamping screw (3, 3') such that the gripping side contacts the profile rail (20) so as to slide the rail along the flat planar bearing surface (6) and clamp the profile rail (20) against the linear hook segment;
the clamping screw (3, 3') penetrates the gripping wedge (2) in the first opening (11) and the slide ramp (10) in a second opening (12), wherein the first and/or second opening (11, 12) is a longitudinal opening (12) oriented perpendicular to the linear hook segment (7);
the main body (1) has a rear surface (9) opposite the flat planar bearing surface (6), to which rear surface the fixture can be tightened by one and the same clamping screw (3, 3') against the another component (30, 31, 40); wherein the main body (1) is disposed to be arranged between the profile rail (20) and the another component (30, 31, 40); and
an elastically-functioning loss-prevention means (5) is provided in a top section of the slide ramp (10), the elastically-functioning loss-prevention means (5) being configured to retain the gripping wedge (2) on the slide ramp (10), the elastically-functioning loss-prevention means (5) being a rubber ring (5) inserted both in a groove on a rear-side area of the slide ramp (10) and in a groove on the gripping side of the gripping wedge (2) facing the profile rail (20).

21. The fixture according to claim 20, wherein a stop (15) for the gripping wedge (2) is provided on a top end of the slide ramp (10).

22. The fixture according to claim 21, wherein a groove (15) partially accommodating the gripping wedge (2) is provided in the stop (15).

* * * * *